Figure 1:
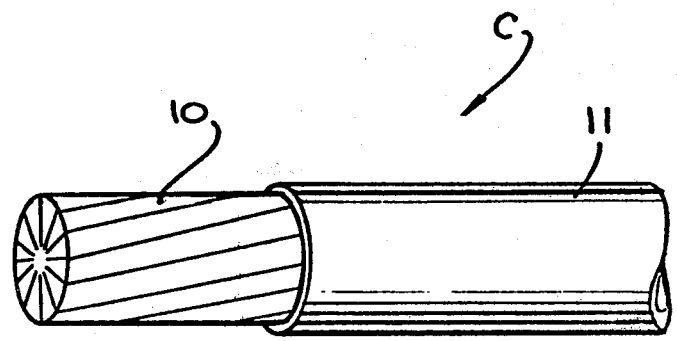

United States Patent [19]

Lanfranconi

[11] 4,383,133
[45] May 10, 1983

[54] ABOVE-GROUND CONDUCTOR UNIT WITH CORONA NOISE REDUCING COVERING

[75] Inventor: Attilio Lanfranconi, Gorgonzola, Italy

[73] Assignee: Societa' Cavi Pirelli S.p.A., Milan, Italy

[21] Appl. No.: 274,461

[22] Filed: Jun. 17, 1981

[30] Foreign Application Priority Data

Jun. 30, 1980 [IT] Italy ................................ 83632 A/80

[51] Int. Cl.³ .......................... H01B 7/30; H01B 7/34
[52] U.S. Cl. ............................. 174/127; 174/120 SC;
428/332; 428/339; 428/368; 428/379; 428/390; 428/391
[58] Field of Search .......................... 174/127, 120 SC; 428/332, 339, 368, 379, 390, 391

[56] References Cited

U.S. PATENT DOCUMENTS

| 3,100,136 | 8/1963 | D'Ascoli et al. | 174/127 |
| 3,155,631 | 11/1964 | Zapp | 174/127 |
| 3,278,673 | 10/1966 | Gore | 174/127 |
| 3,642,638 | 2/1972 | Kitano et al. | 174/127 |
| 4,150,193 | 4/1979 | Burns | 174/120 SC |
| 4,303,574 | 12/1981 | Vostovich | 428/390 |

FOREIGN PATENT DOCUMENTS

| 2805875 | 8/1979 | Fed. Rep. of Germany | 174/120 SC |
| 52-5481 | 1/1977 | Japan | 174/120 SC |
| 52-49478 | 4/1977 | Japan | 174/120 SC |

Primary Examiner—James C. Cannon
Attorney, Agent, or Firm—Brooks, Haidt, Haffner & Delahunty

[57] ABSTRACT

An overhead conductor unit used for transmitting high voltage, alternating current, electrical energy which comprises one conductor or several metallic wires grouped together and a thin plastic cladding, a resin or resin-rubber, around the conductor or wires. The plastic cladding includes at least one conductive composition, generally, carbon black, in an amount of 5–40 parts by weight and at least one hydrorepellent composition present in 1–10 parts by weight. The thus obtained overhead conductor unit reduces, or prevents, corona noises when the unit becomes wet.

10 Claims, 1 Drawing Figure

ABOVE-GROUND CONDUCTOR UNIT WITH CORONA NOISE REDUCING COVERING

The present invention relates to an overhead conductor unit used for transmitting high voltage, alternating current (A.C.), electrical energy. In particular, it relates to a conductor comprising one conductor or a plurality of conductors grouped together and a thin plastic cladding therearound the unit having the characteristic of not emitting any noises, or at least, of emitting negligible noise, during rainfall or significant atmospheric humidity.

Overhead lines comprising bare conductors that are stretched between an appropriate pole system are well-known in the art. Said lines are generally used for the transmission of A.C. electrical energy having a high voltage (400–500 kV). Each conductor has a diameter of a few centimeters and can comprise a single tubular metallic body, or else, more frequently, several metallic wires grouped together.

Along the bare conductor, there is always manifested the so-called "corona effect" which is the ionization of the air in contact with the metallic surface under high voltage and which comprises a series of small electrical discharges. The "corona effect" is proportional to the field gradient existing around the conductor and hence, to the electrical tension applied. In the above-described conditions, the field gradient is around about 20 kV/cm.

One of the consequences of the "corona effect" is the generation of noises. However, when the conductor is dry, noise generation is quite limited, and as for the disburbance effectively caused, it is practically negligible. On the contrary, when the conductor is wet, the noise is much more intense, and this is the source of significant disturbances which are irritating and annoying for passers-by and to those who are inhabitants of the immediate vicinity. Under these conditions in fact, the conductibility of the air increases, and hence, there is had a more intense and effective ionization.

The noise itself, is manifested as a continuous buzzing in the background, accompanied by frequent "peaks" of a higher intensity. The spectral analysis of the frequencies of this noise has permitted the verification of the high frequency (i.e. in the sonic and ultra-sonic ranges) and the low frequency components, corresponding to the network frequency (for example, 50 Hz) and also its harmonics. From this arises the probability of "beats", i.e. of positive or negative combinations of the various acoustic waves, and hence, of increasing or decreasing the noise created.

The suppression, or at least, a drastic reduction of this noise is even more urgently required, particularly when one considers the tendency to progressively increase the working voltage of the overhead lines.

The immediate solution, from the conceptual viewpoint, would appear to be to insulate the conductors themselves by covering them with a layer of insulating plastic material, for the purpose of eliminating the electrical contact between the metallic parts under high electrical tension and the air, and in this manner to suppress the "corona effect". This solution, which would transform each conductor into a kind of an electric cable, presents, nevertheless, various drawbacks.

In the first place, in order to be able to effectively reduce to zero the gradient of the electrical field around the conductor, the insulating plastic cladding must have a rather consistent thickness and be covered with a semi-conductive shield electrically connected to earth. This will involve, on one hand, a significant increase in the weight of the overhead conductor, and on the other hand, an obvious technical complication.

Besides this, the plastic material must also possess chemical and physical characteristics, such as to be resistant, with the passage of time, to the attacks of atmospheric agents, and this implies an elaborate formulation of the plastic material composition.

Moreover, there are obvious technical difficulties involved, for assuring that the insulating cladding or the semi-conductive shield does not become damaged or deteriorated, at the joining-points of the conductors to the insulators that are connected-up on the pole system of the overhead lines. This could give rise to dangerous discharges that could prove destructive throughout the entire insulating cladding.

A second solution is represented by the so-called "sand-blasting process" which consists of treating the surface of the conductors with a spray of abrasive sand. This "sand-blasting" gives rise to the formation of microscopic roughness and upwardly projecting bumps on the conductor surface, which effects are, to some extent, similar to those effects produced through the natural aging process of the metallic conductors which are exposed to the action of atmospheric agents. Tests, carried out on conductors that are treated in this way, have shown a certain reduction in the continuous components of the "background" noises, but on the other hand, an observable increase of the "peaks". Therefore, even this solution is not without its drawbacks.

One object of the present invention is to overcome the hereinbefore stated drawbacks while suppressing or at least drastically reducing, the noise that is generated along the wet conductor of an overhead line, such as during or after a rainfall, or under conditions of elevated atmospheric humidity, for example, fog.

Hence, the main object of the present invention, is a conductor unit for overhead lines which is used for transmitting high voltage, electrical, A.C. current, which comprises one or more metallic conductors with a cladding of plastic material therearound, which unit is characterized by the fact that said covering is constituted by a mixture comprising at least one conductive compound and at least one hydrorepellent compound.

The present invention will be better understood from the following description which should be considered in conjunction with the single figure of the accompanying drawing and from the examples set forth in the Table set forth hereinafter.

It should be understood that said figure and said Table of examples, are merely representative, and are given only by way of indicating particular cases for the practical realization of the conductor unit, within the scope of the present invention.

The FIGURE shows a conductor unit for overhead lines of the invention.

In the FIGURE, there is a conductor unit 'C' comprising several metallic wires 10 grouped together and covered by a thin plastic material cladding 11. Of course, in place of several metallic wires 10 grouped together, there can also be a single tubular metallic body.

The cladding of plastic material which is applied around said wires 10, or over said tubular body, has a very slight thickness. By way of reference, the cladding 11 may be a thin layer having a thickness that is in the range from 1 to 3 mm.

The Applicant has, in fact, surprisingly found that the noises associated with wet conductors that transmit high voltage, A.C. currents, can be suppressed, or at least, drastically reduced, by means of covering the conductors themselves, with a thin plastic cladding on the condition that the mixture which forms said plastic cladding is rendered semi-conductive through the addition of at least one conductive compound and that it is also rendered hydrorepellent by the addition of at least one hydrorepellent compound.

In the Table, there are given the compositions of some preferred examples of said mixtures. In particular, it can be observed, that all the mixtures comprise a plastic resin or resin-rubber base (P.V.C., polyethylene When a conductor unit was prepared according to the present invention, it was verified that the noise, normally present with wet conductors, became suppressed or drastically reduced. The tests have been carried out in a so-called "anechoic chamber", an acoustically insulated chamber, wherein there are disposed conductor lengths kept under electrical tension, and where it is possible to simulate the outside atmospheric conditions. According to known processes, it is possible to measure the intensity of the noise in said chamber and to survey the relative frequency spectrum.

Among the examples shown in the following Table, the best results were obtained by the mixtures corresponding to the examples Nos. 6 and 8.

| | TABLE OF CLADDING MIXTURES | | | | | | | | | | | |
|---|---|---|---|---|---|---|---|---|---|---|---|---|
| | NUMBER OF MIXTURE AND PARTS BY WEIGHT | | | | | | | | | | | |
| COMPOUNDS | 1 | 2 | 3 | 4 | 5 | 6 | 7 | 8 | 9 | 10 | 11 | 12 |
| PVC | 38.5 | 38.5 | 38.5 | 38.5 | 38.5 | 38.5 | 38.5 | 38.5 | 38.5 | 38.5 | — | — |
| POLYETHYLENE | — | — | — | — | — | — | — | — | — | — | 79 | 78 |
| NITRILE RUBBER | 9 | 9 | 9 | 9 | 9 | 9 | 9 | 9 | 9 | — | — | — |
| ETHYLENE VINYL-ACETATE RUBBER | — | — | — | — | — | — | — | — | — | 9 | — | — |
| DIOCTYPHTHALATE | 29 | 29 | 29 | 29 | 29 | 29 | 29 | 29 | 29 | 29 | — | — |
| LEAD TRIBASIC-SULPHATE | 3 | 3 | 3 | 3 | 3 | 3 | 3 | 3 | 3 | 3 | — | — |
| CALCIUM STEARATE | 1.3 | 1.3 | 1.3 | 1.3 | 1.3 | 1.3 | 1.3 | 1.3 | 1.3 | 1.3 | — | — |
| BISPHENOL | 0.2 | 0.2 | 0.2 | 0.2 | 0.2 | 0.2 | 0.2 | 0.2 | 0.2 | 0.2 | — | — |
| ANTIOXIDANT | — | — | — | — | — | — | — | — | — | — | 1 | 1 |
| CARBON-BLACK | 15 | 16 | 17 | 15 | 16 | 16 | 14 | 12 | 12 | 16 | 16 | 14 |
| METHYLPOLYSILOXANIC RESIN 100% (in powder form) | — | 3 | — | — | — | — | — | — | — | — | — | — |
| METHYLTRIETOXYSILAN | 4 | — | — | — | — | — | — | — | — | — | — | — |
| DIMETHYLPOLYSILOXAN OIL (Visc. - 20 centistokes) | — | — | 2 | — | — | — | — | 2 | 2 | — | — | 2 |
| DIMETHYLPOLYSILOXAN OIL (Visc. - 500,000 centistokes) | — | — | — | 4 | — | — | — | — | — | — | 4 | — |
| DIMETHYLPOLYSILOXAN OIL (Visc. - 1,000,000 centistokes) | — | — | — | — | 3 | — | — | 5 | — | — | — | 5 |
| POLYETHYLENE WAX (dropping point - 100–120° C.) | — | — | — | — | — | 3 | — | — | 5 | 3 | — | — |
| PARAFINIC MIXTURE (dropping point - 60–80° C.) | — | — | — | — | — | — | — | 5 | — | — | — | — | etc. nitrile rubber, ethylene rubber, vinyl-acetate rubber etc.), various additives (anti-oxidants, plasticizers, lubricants etc.), at least one conductive compound and at least one hydrorepellent compound.

Said conductive compound, which generally will be a carbon-black, permits the electrical field around said plastic cladding to be equal, or nearly equal, to the electrical field around the bare conductor. The quantity, in parts by weight, of said conductive compound, or of a mixture of said conductive compounds, can vary from 5 to 40 parts by weight to 100 parts by weight of the mixture itself.

The hydrorepellent compounds used in the examples given in the Table, are as follows: Methyltrietoxysilanic resin 100% in powder form, Methyltrietoxysilan, Dimethylpolysiloxan oil having three viscosities (20, 500,000, 1,000,000 centistokes), Polyethylene wax having a dropping point of 100°–120° C., and a Paraffinic Mixture having a dropping point of 60°–80° C.

The quantity of parts of weight, of said hydrorepellent compounds, when used alone, or mixed together, can vary from 1 to 10 parts by weight to 100 parts by weight of the mixture.

Said hydrorepellent compound permits the water, which falls onto the conductor, as a result of rainfall, or as a result of the condensation of water-vapour in the atmosphere, to become repelled by the plastic cladding. In this way, the greater part of the conductor unit surface remains dry.

The advantages of the present invention can be attributed, by way of hypothesis, to the fact that the hydrorepellent character of the plastic cladding material, forces the water to collect in the form of considerably large drops. In this way, the drops spontaneously fall off the conductor as a result of the weight thereof.

On the other hand, the semi-conductive character of the plastic material causes said cladding to remain unstressed by any significant field gradient, and hence, it is not subjected to any rapid deterioration. As has already been stated, even when the conductor is covered by insulation, there is always established a certain gradient between conductor and the air unless the insulation has a very great thickness, and there is a further covering of a semi-conductive shield.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A conductor unit for overhead lines for transmitting high voltage, alternating, electric current, said unit comprising one or more electric conductors and a thin, outermost, semi-conductive layer surrounding and in contact, at its inner surface, with the periphery of said conductor or of the plurality of conductors, said layer comprising a mixture of an insulating material, at least one conductive material in an amount of 5 to 40 parts by weight of the total weight of the mixture and at least one hydrorepellent material in an amount from 1 to 10 parts by weight of the total weight of the mixture, said unit having the characteristic that during rainfall or significant atmospheric humidity, corona noise is suppressed or is drastically reduced as compared to the same unit without a hydrorepellent material in the semi-conductive layer.

2. A conductor unit as set forth in claim 1 wherein said conductive material is carbon black.

3. A conductor unit as set forth in claim 1 or 2 wherein the thickness of the semi-conductive layer is in the range from 1 to 3 millimeters.

4. A conductor unit as set forth in claim 1 or 2 wherein said hydrorepellent material is methyltrietoxysilan.

5. A conductor unit as set forth in claim 1 or 2 wherein said hydrorepellent material is methylpolysiloxanic resin 100% in powder form.

6. A conductor unit as set forth in claim 1 or 2 wherein said hydrorepellent material is dimethylpolysiloxan oil having a viscosity of 20 centistokes.

7. A conductor unit as set forth in claim 1 or 2 wherein said hydrorepellent material is dimethylpolysiloxan oil having a viscosity of 500,000 centistokes.

8. A conductor unit as set forth in claim 1 or 2 wherein said hydrorepellent material is dimethylpolysiloxan oil having a viscosity of 1,000,000 centistokes.

9. A conductor unit as set forth in claim 1 or 2 wherein said hydrorepellent material is polyethylene wax having a dropping point of 100°–200° C.

10. A conductor unit as set forth in claim 1 or 2 wherein said hydrorepellent material is a paraffinic mixture having a dropping point of 60°–80° C.

* * * * *